United States Patent
Ishikawa

(10) Patent No.: US 9,365,249 B2
(45) Date of Patent: Jun. 14, 2016

(54) VEHICLE FRONT PART STRUCTURE WITH SPATS TO RESTRAIN WIND FLOW IN FRONT OF THE FRONT WHEEL

(71) Applicant: Akihiko Ishikawa, Miyoshi (JP)

(72) Inventor: Akihiko Ishikawa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/410,217

(22) PCT Filed: Sep. 6, 2013

(86) PCT No.: PCT/IB2013/001920
§ 371 (c)(1),
(2) Date: Dec. 22, 2014

(87) PCT Pub. No.: WO2014/049407
PCT Pub. Date: Apr. 3, 2014

(65) Prior Publication Data
US 2015/0266522 A1 Sep. 24, 2015

(30) Foreign Application Priority Data
Sep. 28, 2012 (JP) ................. 2012-218205

(51) Int. Cl.
*B62D 35/02* (2006.01)
*B62D 35/00* (2006.01)

(52) U.S. Cl.
CPC .............. *B62D 35/02* (2013.01); *B62D 35/005* (2013.01)

(58) Field of Classification Search
CPC ....... B62D 35/00; B62D 35/02; B62D 35/005
USPC ...................................... 296/180.1
See application file for complete search history.

(56) References Cited

U.S. PATENT DOCUMENTS

| 4,976,489 A * | 12/1990 | Lovelace | B62D 35/005 296/180.1 |
| 8,276,973 B2 * | 10/2012 | Hasegawa | B62D 25/16 296/180.1 |
| 8,517,451 B2 * | 8/2013 | Kakiuchi | B62D 35/02 296/180.1 |
| 8,668,245 B2 * | 3/2014 | Kakiuchi | B62D 35/02 180/69.1 |
| 2003/0173798 A1 * | 9/2003 | Steinicke | B62D 35/00 296/180.1 |
| 2011/0309652 A1 * | 12/2011 | Eichentopf | B60G 7/001 296/180.1 |
| 2015/0008698 A1 * | 1/2015 | Reisenhofer | B62D 25/20 296/180.1 |

(Continued)

FOREIGN PATENT DOCUMENTS

| JP | H01-81389 U | 5/1989 | |
| JP | H10-278856 A | 10/1998 | |
| JP | 2006-327281 | * 12/2006 | ............. B62D 35/02 |

(Continued)

*Primary Examiner* — Gregory Blankenship
(74) *Attorney, Agent, or Firm* — Oliff PLC

(57) ABSTRACT

A vehicle front part structure includes: a spats having a mounting portion attached to an under wall that constitutes an under floor in front of a front wheel, and a main body portion extending from the mounting portion toward an underside of a vehicle to restrain a traveling wind under the under wall from hitting the front wheel; and a recess portion formed at the vehicular rearward portion on, the under wall and opening to a downward direction of the vehicle and to a rearward direction of the vehicle. A mounting wall is disposed above a front end portion of the under wall to attach the mounting portion to it. An inclined wall is disposed to ascend linearly toward an upper part of the vehicle and connects the mounting wall and the front end portion of the under wall.

3 Claims, 2 Drawing Sheets

(56) References Cited

U.S. PATENT DOCUMENTS

2015/0210324 A1* 7/2015 Kojima ............... B62D 35/005
296/180.1
2015/0225026 A1* 8/2015 Ohira .................. B62D 25/08
296/180.1

FOREIGN PATENT DOCUMENTS

| JP | 2007-168620 A | 7/2007 |
| JP | 2011-131679 A | 7/2011 |
| JP | 2012-086657 A | 5/2012 |

\* cited by examiner

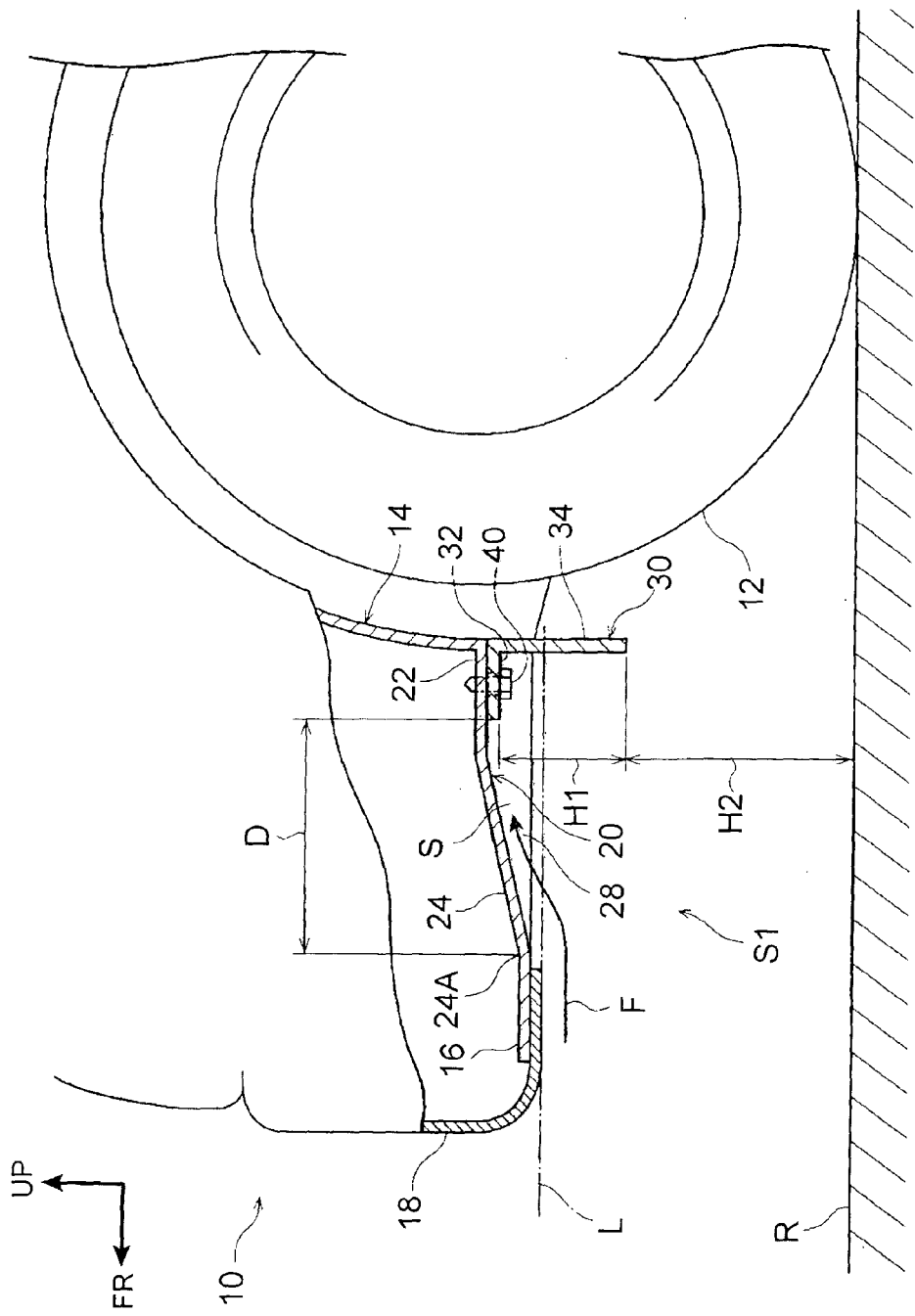

VEHICLE FRONT PART STRUCTURE WITH SPATS TO RESTRAIN WIND FLOW IN FRONT OF THE FRONT WHEEL

FIELD OF THE INVENTION

The present invention relates to a vehicle front part structure having a spats.

DESCRIPTION OF RELATED ART

In a front part structure of an automobile described in Japanese Patent Application Publication No. 2007-168620 (JP 2007-168620 A), a tire deflector (spats) is provided in front of a front wheel. The tire deflector is attached to the bumper face with its own mounting portion. Also, the tire deflector has a main body portion which is formed into a plate to extend toward the vehicular lower side from the mounting portion. Thus, while the vehicle is running, the traveling wind hits the main body portion to restrain the traveling wind from directly hitting the front wheel.

By the way regarding the tire deflector, the aerodynamic performance of the vehicle obtained by the tire deflector can be improved more as the height dimension (or height dimension) of the main body portion becomes larger. Namely, larger height dimension (or height dimension) results in larger area of the main body portion, and the amount of traveling wind hitting the main body portion becomes larger. Thus, direct hitting of the travelling wind onto the front wheel can be restrained further.

In the case of tire deflector, however, lower end of the main body portion must be disposed at the position separated from the road surface by the minimum distance above ground, imposing a limitation on the height dimension of the main body portion.

SUMMARY OF THE INVENTION

The present invention provides a vehicle front part structure which allows extension of the height dimension of a main body portion on a spats to improve the aerodynamic performance of a vehicle obtained by the spats.

A aspect of the present invention relates to a vehicle front part structure provided with: a spats having a mounting portion attached to the under wall that constitutes an under floor in front of a front wheel in a fore-aft direction of a vehicle, and a main body portion extending from the mounting portion toward an underside of a vehicle to restrain a traveling wind flowing under the under wall from hitting the front wheel; and a recess portion formed at the vehicular rearward portion on the under wall and opening to a downward direction of the vehicle and to a rearward direction of the vehicle: The recess portion includes a mounting wall constituting a bottom wall of the recess portion and disposed above a front end portion of the under wall so as to attach the mounting portion to the mounting wall; and an inclined wall which constitutes a front wall of the recess portion and disposed to incline upwardly toward a rear portion of the vehicle when viewed from a side of the vehicle, and which connects the mounting wall and the front end portion of the under wall.

The under floor in front of the front wheel is composed by the under wall. The mounting portion of the spats is attached to the under wall, and the main body portion of the spats is extended toward the vehicular lower side from the mounting portion. Thus, the traveling wind flowing under the under wall hits the main body portion to restrain the traveling wind from directly hitting the front wheel.

The recess portion is formed at the vehicular rearward portion on the under wall in a manner that it opens to a downward direction of the vehicle and to a rearward direction of the vehicle. The bottom wall of the recess portion constitutes the mounting wall which is disposed above the front end portion of the under wall, and is connected to the front end portion of the under wall via the inclined wall.

Thus, the mounting portion of the spats can be disposed in the upper position on the vehicle in comparison with the hypothetical case where the mounting wall is set at the same height as the front end portion of the under wall. Therefore, in comparison with the case described above, the surface area of the main body portion of the spats hit by the traveling wind can be made larger by extending the height dimension (or dimension in the height direction of the vehicle) of the main body portion. Thus, larger amount of traveling wind hits the main body portion, whereby the aerodynamic performance of the vehicle obtained by the spats can be improved.

A space may be formed inside the recess portion for drawing the traveling wind flowing under the under wall toward the inclined wall to regulate the traveling wind so that the traveling wind flows toward the main body portion.

While the vehicle is running, the traveling wind flowing under the under wall is drawn-in toward the inclined wall, and then regulated to flow toward the main body portion of the spats. Thus, part of the traveling wind on the vehicular front side of the front wheel can be introduced into the recess portion so that the traveling wind hits the main body portion. Therefore, the aerodynamic performance of the vehicle obtained by the spats can be improved further.

The recess portion may be open at least either to an outer side of the vehicle in the vehicular transverse direction or to an inner side of the vehicle in the vehicular transverse direction.

Since the recess portion is open at least either to an outer side in the vehicular transverse direction or to an inner side of the vehicle in the vehicular transverse direction, part of the traveling wind hitting the spats while the vehicle is running can be made to flow along the vehicular transverse direction. Thus, the air at a side in the transverse direction of the spats can be regulated by the traveling wind having hit the spats, for instance. Especially, when the recess portion is open to the outer side of the vehicle in the vehicular transverse direction, for instance, the air outside of the front wheel in the vehicular transverse direction can be regulated by the traveling wind that has hit the spats.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a side cross sectional view showing the front end portion of the fender liner shown in FIG. 1 viewed from the left side of the vehicle (cross sectional view taken along line 2-2 in FIG. 1).

DETAILED DESCRIPTION OF EMBODIMENTS

First Embodiment

Figure 1:
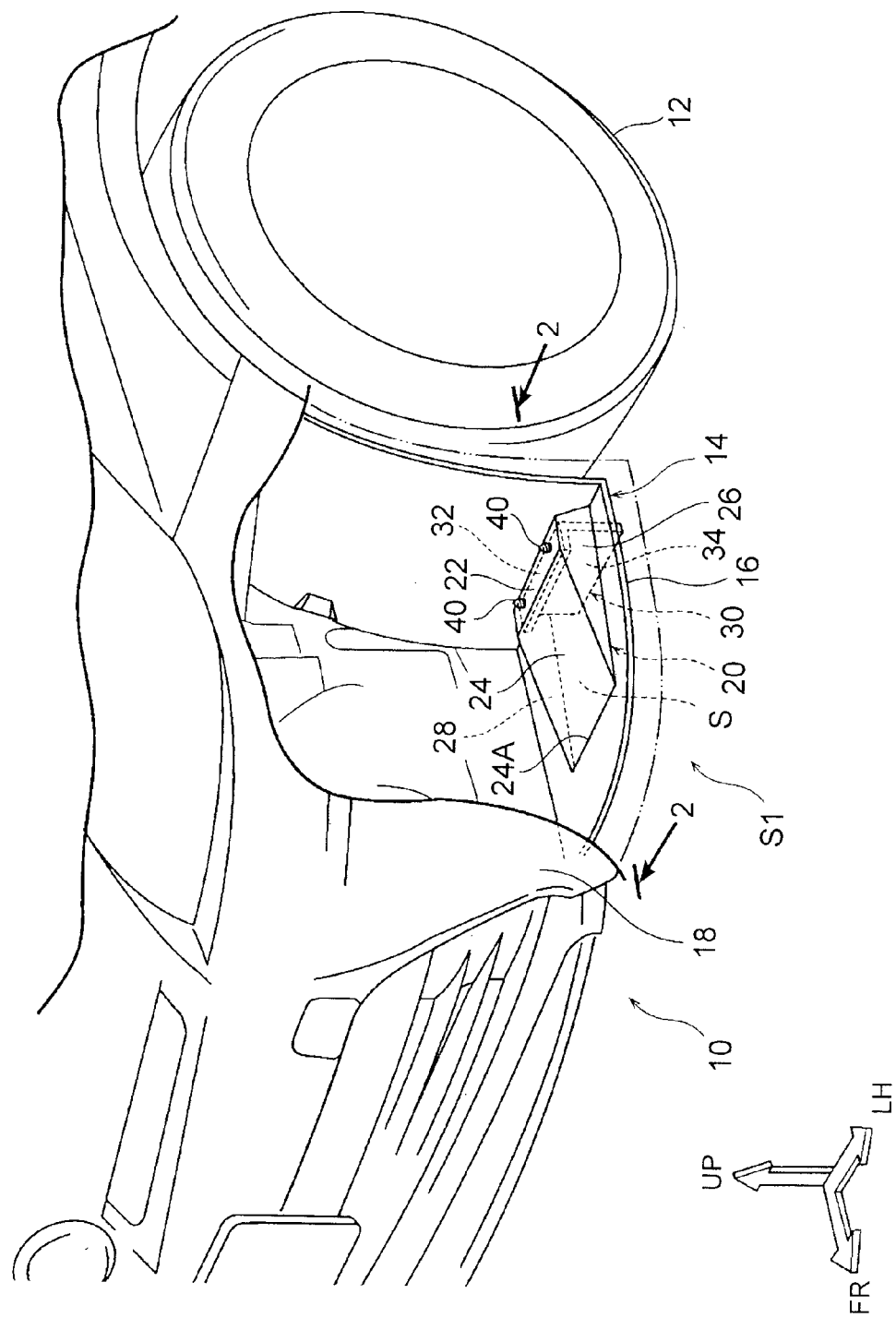
FIG. 1 is a partially cutaway perspective view showing the vehicular major part viewed from diagonally forward left of the vehicle, to which the vehicle front part structure according to the first embodiment is applied.

FIG. 1 is a partially cutaway perspective view showing the front part of a vehicle 10 viewed from diagonally forward left of the vehicle, to which a vehicle front part structure S1 according to a first embodiment of the present invention is applied. Note that in FIGS. 1 and 2, forward of the vehicle is indicated by an arrow FR, left side of the vehicle (one side in the transverse direction) is indicated by an arrow LH, and upward of the vehicle is indicated by an arrow UP. Also, since the vehicle front part structure S1 is configured symmetrically in the transverse direction of the vehicle, description will be made regarding the left side portion of the front part of the vehicle 10, and description regarding the right side portion of the front part of the vehicle 10 will be omitted.

As shown in FIG. 1, the vehicle 10 has a front tire 12 serving as a "front wheel", with a fender liner 14 being provided outside in a radial direction of the front tire 12. The fender liner 14 is a plate formed into an almost arch shape opening to the downward direction of the vehicle in a side view, and covering the upper part of the front tire 12 from the above where upper part of the vehicle lies. Also, a front end portion of the fender liner 14 is bent toward the forward part of the vehicle with the direction of plate thickness being aligned with the height direction of the vehicle, to constitutes an under floor of the vehicle 10 in front of the front tire 12 in a fore-aft direction of the vehicle. Thus, the front end portion of the fender liner 14 constitutes an under wall 16. Further, lower end portion of a bumper cover 18 is joined to the side portion in the transverse direction of the vehicle and the forward portion of the vehicle in an outer periphery of the under wall 16.

As shown in FIGS. 1 and 2, a recess portion 20 is formed at the vehicular rearward portion on the under wall 16. The recess portion 20 is protruding upward of the vehicle from the under wall 16, and opens to the downward direction of the vehicle and to the rearward direction of the vehicle. A bottom wall of the recess portion 20 constitutes part of the rear end portion of the under wall 16, and used as a mounting wall 22 to attach an air spats 30 which will be described later. The mounting wall 22 is disposed in the upper position on the vehicle relative to the front end portion of the under wall 16 and the lower end portion of the bumper cover 18, with the direction of plate thickness being aligned with the height direction of the vehicle.

Forward wall of the recess portion 20 constitutes an inclined wall 24. The inclined wall 24 is disposed to ascend linearly toward the upper part of the vehicle as it comes closer to the vehicular rear part (incline upwardly toward a rear portion of the vehicle) when viewed from the side, and to connect the front end portion of the under wall 16 and the mounting wall 22. In other words, the mounting wall 22 is connected to the front end portion of the under wall 16 by means of the inclined wall 24. Thus, the front end portion of the under wall 16 according to the present embodiment refers to the vehicular forward area from the front end 24A of the inclined wall 24 on the under wall 16.

Further, as shown in FIG. 1, a first side wall 26 constituting an outer side wall of the recess portion 20 in transverse direction of the vehicle, and a second side wall 28 constituting an inner side wall of the recess portion 20 are provided to incline toward the vehicular lower part so that the distance between a portion of the first side wall 26 and a portion of the second wall 28 increases when viewed from the vehicle front. The first side wall 26 and the second side wall 28 connect the under wall 16 to the mounting wall 22 and the inclined wall 24.

Further, as shown in FIGS. 1 and 2, the air spats 30, generally formed into an inverted letter "L" in a side view, is provided on the underside of the mounting wall 22. A mounting portion 32, generally shaped as an elongated plate, is formed at the top of the air spats 30. The mounting portion 32 is disposed underside of the mounting wall 22, with the longitudinal direction being aligned with the transverse direction of the vehicle and the plate thickness direction of the mounting portion 32 being aligned with the height direction of the vehicle. The mounting portion 32 is fastened to. the mounting wall 22 by means of tightening members such as bolts 40 (see FIG. 2). The mounting portion 32 is disposed in the upper position on the vehicle relative to the lower end portion of the bumper cover 18 and the front end portion of the under wall 16.

Further, as shown in FIG. 2, the air spats 30 has a main body portion 34. The main body portion 34 has a generally rectangle shape and extends downward of the vehicle from the rear end of the mounting portion 32. The lower end of the main body portion 34 is disposed in the lower position on the vehicle relative to the base line L running in the fore-and-aft direction of the vehicle and passing through the lower end of the bumper cover 18. The dimension of the main body portion 34 in the height direction of the vehicle is indicated as a height dimension H1, while the distance between the lower end of the main body portion 34 and a road surface R is indicated as a minimum height above ground H2 of the vehicle 10.

By the way, the upper part of the air spats 30 (or of the main body portion 34) is disposed inside the recess portion 20, and a given space S is formed within the recess portion 20 in the vehicular forward direction from the upper part of the air spats 30. While the vehicle 10 is running, part of a traveling wind F flowing under the bumper cover 18 is drawn into the recess portion 20 (or the space S) by the inclined wall 24, and is guided toward the upper part of the main body portion 34. Namely, the inclined wall 24 is formed so that part of the traveling wind F flows smoothly into the recess portion 20 along the inclined wall 24 (without departing from the inclined wall 24). Note that according to the present embodiment, the inclined wall 24 is formed generally in the center of the under wall 16 in the v fore-and-aft direction of the vehicle. The front end 24A of the inclined wall 24 is disposed on the vehicular forward side relative to the center of the under wall 16 in the fore-and-aft direction, separated from the mounting portion 32 of the air spats 30 by a given distance D toward the vehicular forward direction.

Next, the operation and effect of the present embodiment will be described.

In the vehicle 10 where the vehicle front part structure S1 configured as described above is applied, the under wall 16 constituting the under floor of the vehicle 10 is disposed on the vehicular front side of the front tire 12. The recess portion 20 which is open to the downward direction of the vehicle and to the rearward direction of the vehicle is formed in the vehicular rear portion on the under wall 16. The air spats 30 are attached to the mounting wall 22 of the recess portion 20.

While the vehicle 10 is running, part of the traveling wind F generated on the vehicular lower side of the lower end portion of the bumper cover 18 is drawn into the recess portion 20 by the inclined wall 24, and hits the main body portion 34 of the air spats 30 disposed within the recess portion 20. Thus, the traveling wind F directly hitting the front tire 12 can be restricted by the air spats 30.

Here, the mounting wall 22 of the recess portion 20 is disposed in the upper position on the vehicle relative to the front end portion of the under wall 16, and connected to the front end portion of the under wall 16 by the inclined wall 24. Thus, the mounting portion 32 of the air spats 30 can be disposed in the upper position on the vehicle in comparison with the hypothetical case where the mounting wall 22 is set at the same height as the front end portion of the under wall 16 (or the lower end portion of the bumper cover 18). Namely, while the lower end of the main body portion 34 of the air spats 30 is disposed at the position separated from the road surface by the minimum height above ground H2, restriction on the height dimension H1 of the air spats 30 can be eliminated by disposing the mounting portion 32 of the air spats 30 in the upper position on the vehicle. Therefore, in comparison with the case described above, the surface area of the main body portion 34 to be hit by the traveling wind F can be made larger by extending the height dimension H1 of the main body portion 34. Thus, larger amount of traveling wind F hits the main body portion 34, whereby the aerodynamic performance of the vehicle 10 obtained by the air spats 30 can be improved.

In addition, the space S is formed within the recess portion 20 to draw-in the traveling wind F toward the inclined wall 24 so that the traveling wind F is regulated to flow to the main body portion 34. Thus, part of the traveling wind F flowing on the vehicular front side of the front tire 12 is introduced into the recess portion 20, which makes the traveling wind F hit the main body portion 34. Therefore, the aerodynamic performance of the vehicle 10 obtained by the air spats 30 can be improved further.

As described above, the front end portion of the under wall 16 and the mounting wall 22 are connected by the inclined wall 24 which is inclined upward of the vehicle as it comes closer to the rear of the vehicle in the side view. Thus, while the vehicle 10 is running, the traveling wind F flowing under the under wall 16 is drawn into the recess portion 20 smoothly along the inclined wall 24, and is guided toward the air spats 30 (or the main body part 34.) In this way, the height dimension H1 of the main body portion 34 can be extended while restraining the turbulence of the traveling wind F flowing under the under wall 16.

Second Embodiment

The second embodiment is constituted in the same way as the first embodiment except for the features described below. Namely, according to the second embodiment, the first side wall 26 is omitted in the recess portion 20 on the under wall 16 and the mounting wall 22 and the inclined wall 24 in the recess portion 20 are extended outwardly in the transverse direction of the vehicle, to make the recess portion 20 open to the outer side of the vehicle along the transverse direction of the vehicle. In addition, the air spats 30 is attached to the mounting wall 22 of the recess portion 20 so that the main body portion 34 of the air spats 30 is disposed on the vehicular front side of the front tire 12.

Thus, the second embodiment can provide the operation and effect similar to those of the first embodiment. Further in the second embodiment, part of the traveling wind F is made to flow outward in the transverse direction of the vehicle after hitting the main body portion 34 of the air spats 30, since the recess portion 20 is open to the outer side of the vehicle along the transverse direction of the vehicle. Thus, the air outside of the air spats 30 in the transverse direction of the vehicle can be regulated by the traveling wind F having hit the main body portion 34 of the air spats 30. Further, by appropriately setting the angle of the main body portion 34 of the air spats 30 relative to the transverse direction of the vehicle, the air outside of the front tire 12 in the transverse direction of the vehicle can be regulated by the traveling wind F having hit the main body portion 34 of the air spats 30.

Although the recess portion 20 is configured to open to the outer side of the vehicle in the transverse direction of the vehicle according to the second embodiment, the recess portion 20 may be configured to open to the inner side of the vehicle in the transverse direction of the vehicle by omitting the second side wall 28 of the recess portion 20. In this case, the air inward from the front tire 12 in the transverse direction of the vehicle can be regulated by the traveling wind F having hit the main body portion 34. Also in this case, external appearance of the vehicle 10 can be improved when viewed from the side, since the lower end portion of the bumper cover 18 can be joined to the external part in the vehicular transverse direction of the outer periphery of the under wall 16. Alternatively, the recess portion 20 may be configured to open to the outer side of the vehicle and also to the inner side of the vehicle in the transverse direction of the vehicle by omitting the first side wall 26 and the second side wall 28 of the recess portion 20.

According to the first embodiment and the second embodiment, the inclined wall 24 is disposed to ascend linearly toward the upper part of the vehicle as it comes closer to the rear part of the vehicle when viewed from the side. Alternatively, the inclined wall 24 may be inclined in a curved line toward the upper part of the vehicle as it comes closer to the rear part of the vehicle when viewed from the side. For instance, the inclined wall 24 may be shaped to have a curve convexed toward the upper and diagonally forward part of the vehicle when viewed from the side.

Further, according to the first embodiment and the second embodiment, the front end portion of the fender liner 14 constitutes the under wall 16, and the recess portion 20 is formed on the under wall 16. However, the member on which the recess portion 20 is formed is not limited to the under wall 16. For instance, an under-cover that constitutes the under part of the vehicle 10 may be disposed between the front tire 12 and the bumper cover 18, and the recess portion 20 may be formed on the under-cover.

The invention claimed is:

1. A vehicle front part structure comprising:
   a spats including a mounting portion attached to an under wall that constitutes an under floor in front of a front wheel in a fore-aft direction of a vehicle, and a main body portion extending from the mounting portion away from an underside of the vehicle to restrain a traveling wind flowing under the under wall from hitting the front wheel; and
   a recess portion formed at a vehicular rearward portion on the under wall and opening to a downward direction of the vehicle and to a rearward direction of the vehicle,
   wherein the recess portion includes:
       a mounting wall constituting a bottom wall of the recess portion and disposed above a front end portion of the under wall so as to attach the mounting portion to the mounting wall, and
       an inclined wall which constitutes a front wall of the recess portion, inclines upwardly toward a rear portion of the vehicle when viewed from a side of the vehicle, and connects the mounting wall and the front end portion of the under wall,
   wherein an angle between the inclined wall and the mounting wall is obtuse.

2. The vehicle front part structure according to claim 1, wherein a space is formed inside the recess portion for drawing the traveling wind flowing under the under wall toward the inclined wall to regulate the traveling wind so that the travelling wind flows toward the main body portion.

3. The vehicle front part structure according to claim 1, wherein the recess portion is open at least either to an outer side of the vehicle in a vehicular transverse direction or to an inner side of the vehicle in the vehicular transverse direction.

* * * * *